(12) United States Patent
Poskie et al.

(10) Patent No.: US 8,177,047 B2
(45) Date of Patent: May 15, 2012

(54) ADAPTABLE ASSEMBLY FIXTURE APPARATUS

(75) Inventors: Fredrick R. Poskie, Plymouth, MI (US); Baden Michael Powell, Tecumseh (CA); Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 12/880,890

(22) Filed: Sep. 13, 2010

(65) Prior Publication Data

US 2012/0061208 A1   Mar. 15, 2012

(51) Int. Cl.
*B65G 15/64* (2006.01)

(52) U.S. Cl. .................................. 198/345.3; 198/345.2

(58) Field of Classification Search ............... 198/345.1, 198/345.2, 345.3, 346.1, 346.2, 346.3; 29/33 P; 414/749.6, 749.1
See application file for complete search history.

*Primary Examiner* — James R Bidwell

(57) ABSTRACT

An apparatus for transporting a first workpiece assembly, the apparatus includes a pallet, a universal fixture and an adaptable fixture. The pallet has a rectangular base and support members fixed to opposite edges of the base. The universal fixture has a frame, a first and second support arms and three workpiece mounts. The support arms are fixed to opposite sides of the frame and are rotatably supported in the support members of the pallet. The adaptable fixture has a frame, three fixture mounts and three workpiece mounts. The fixture mounts are disposed on the bottom surface of the frame and aligned with the workpiece mounts of the universal fixture. The workpiece mounts of the adaptable fixture are disposed on the top surface of the frame and aligned with a first, second and third locator of a workpiece assembly.

20 Claims, 4 Drawing Sheets

ADAPTABLE ASSEMBLY FIXTURE APPARATUS

FIELD

The present invention relates generally to an assembly fixture system used in an assembly line, and more particularly to an assembly fixture system for use in assembling multiple transmission models within the same transmission family on the same assembly line.

BACKGROUND

The statements in this section merely provide background information related to the present disclosure and may or may not constitute prior art.

Typical manufacturing or assembly systems include conveying systems for transporting assemblies such as engines or transmissions between numerous workstations that perform various operations on the assemblies. The conveying systems include assembly pallets which carry assemblies from one workstation to the next. Previous assembly practices created a single engine or transmission design which was assembled on a dedicated assembly line. As vehicle engineering and manufacturing systems became more complex, engineers created a family of engine or transmission designs which included a similar basic architecture while having slight variations in, for example, packaging requirements. However, because of the limited flexibility of the assembly lines, different models within the family are required to have common features that were used by the assembly system to process the assembly. This forces the design for the assembly system to compensate for the assembly process when designing an engine or transmission, which in turn can lead to compromises in the effectiveness and efficiency of the engine or transmission.

One solution is to create a unique assembly pallet for each model of the design family. While this allows the design of the assembly to focus on factors other than the assembly process, the unique assembly pallets created a large additional cost that can add to the overall cost of the product.

While these improvements in assembly efficiency have proven meaningful, there is a constant desire to reduce the cost and complexity of the assembly system. Accordingly, there is room in the art for an improved assembly fixture adapter system having a universal assembly pallet and an adaptable assembly fixture.

SUMMARY

The present invention provides an apparatus for transporting a first workpiece assembly on an assembly line. The apparatus includes a pallet, a universal fixture and an adaptable fixture. The pallet has a rectangular base, a first support member and a second support member. The base has a first edge and a second edge opposite the first edge. The first support member has first end fixed to the first edge of the base and the second support member has a first end fixed to the second edge of the base. The universal fixture has a frame, a first and a second support arms, and a first, a second and a third workpiece mounts. The frame has a first member and a second member opposite the first member. A first end of the first support arm fixed to the first member of the frame and a first end of the second support arm fixed to the second member of the frame. The first, second and third workpiece mounts are fixed to at least the first and second members of the frame. The universal fixture is rotatably supported by the first and second support members of the fixture pallet through the first and second support arms. The adaptable fixture has a frame, a first, a second and a third fixture mounts and a first, a second and a third workpiece mounts. The frame has a top and a bottom surface. The fixture mounts are disposed on the bottom surface of the frame and aligned with the workpiece mounts of the universal fixture. The first, second and third workpiece mounts of the adaptable fixture are disposed on the top surface of the frame and aligned with a first, second and third locator of the workpiece assembly.

In one example of the present invention, the support members of the pallet each include a second end having a semicylindrical member. The semicylindrical member of the first support member is axially aligned with the semicylindrical member of the second support member.

In another example of the present invention, the first and the second support arm of the universal fixture each have a cylindrical portion. The cylindrical portion of the first support arm having an axis aligned with an axis of the cylindrical portion of the second support arm.

In yet another example of the present invention, the cylindrical portion of the first support arm is rotatably supported by the second end of the first support member of the fixture pallet and the cylindrical portion of the second support arm is rotatably supported by the second end of the second support member.

In yet another example of the present invention, the universal fixture has a 360° rotational range of motion relative to the pallet around the axis of the cylindrical portions of the support arms.

In yet another example of the present invention, at least one of the semicylindrical members of the pallet and the cylindrical portions of the universal fixture includes a rotational locking mechanism.

In yet another example of the present invention, the workpiece mounts of the universal fixture and the adaptable fixture include clamping mechanisms.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
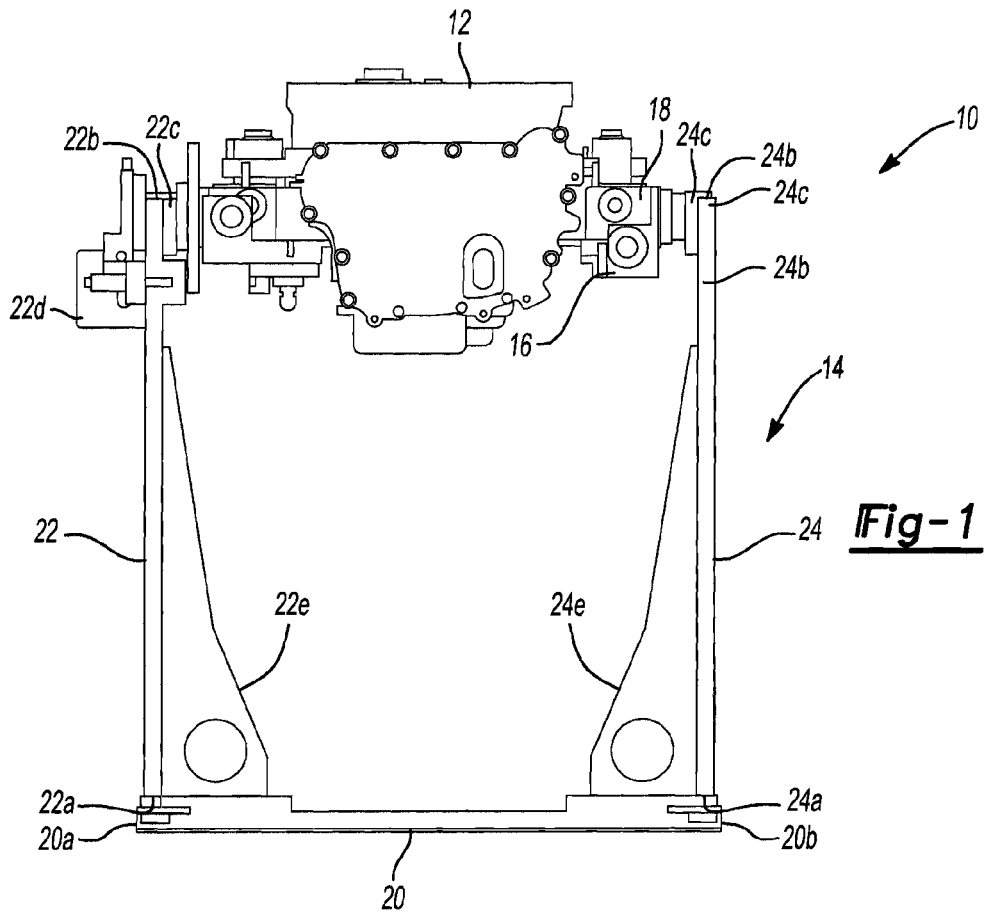
FIG. 1 is a side view of an adaptable assembly fixture apparatus in accordance with an example of the present invention.

Referring to the drawings, wherein like reference numbers refer to like components, in FIG. 1 a side view of an adaptable assembly fixture apparatus 10 carrying a first workpiece 12, or in this example a first transmission, according to the principles of the present invention is shown and will now be described. In general, the adaptable assembly fixture apparatus 10 is used to carry the first workpiece 12 on a conveyor system through a number of workstations (not shown) or an assembly line. However, the adaptable assembly fixture apparatus 10 is capable of being transported through an assembly or other process by any means, including an automatic guided vehicle or the like, without departing form the scope of this disclosure. The conveyor transports the adaptable assembly fixture apparatus 10 from one workstation to the next and holds the workpiece 12 in the workstation while an assembly personnel or machine performs an operation on the workpiece 12. The adaptable assembly fixture apparatus 10 includes a pallet 14, a universal fixture 16 and an adapter fixture 18. The pallet 14 includes a base 20 and a first and a second support member 22 and 24. The base 20 may be predominantly rectangular and flat and is capable of being transported on a conveyor system (not shown). The first and second support members 22, 24 each have a first end 22A, 24A and a second end 22B, 24B. The first end 22A of the first support member 22 is fixed at a right angle to a first edge 20A of the base 20 while the first end 24A of the second support member 24 is fixed at a right angle to a second edge 20B of the base 20 which is opposite the first edge 20A. The second ends 22B, 24B of the support members 22, 24 each include a semicylindrical member 22C, 24C. The semicylindrical members 22C, 24C resemble cylinders that are halved lengthwise and are axially aligned with each other. A pair of flanges 22E, 24E provides additional strength to the support members 22, 24.

Figure 2:
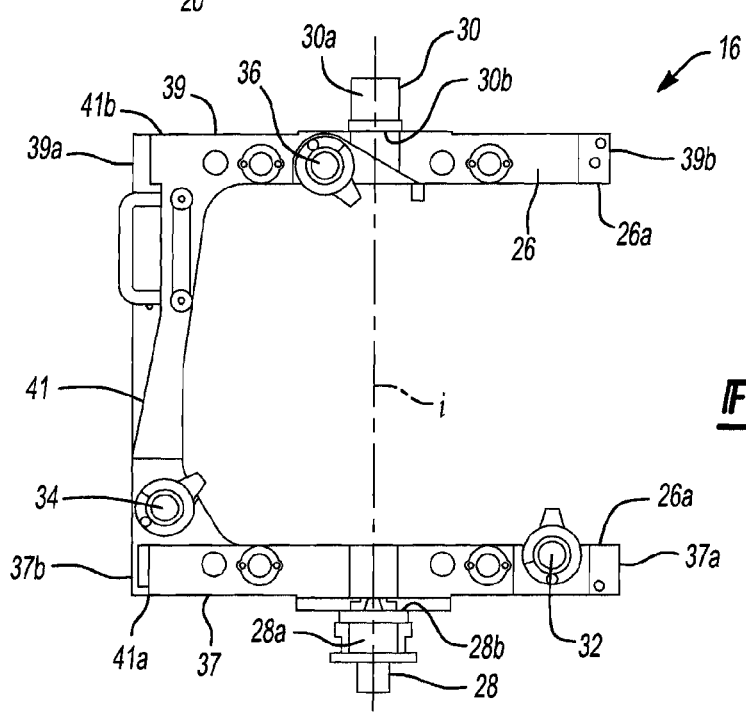
FIG. 2 is a plan view of a universal fixture in accordance with an example of the present invention.
Figure 3:
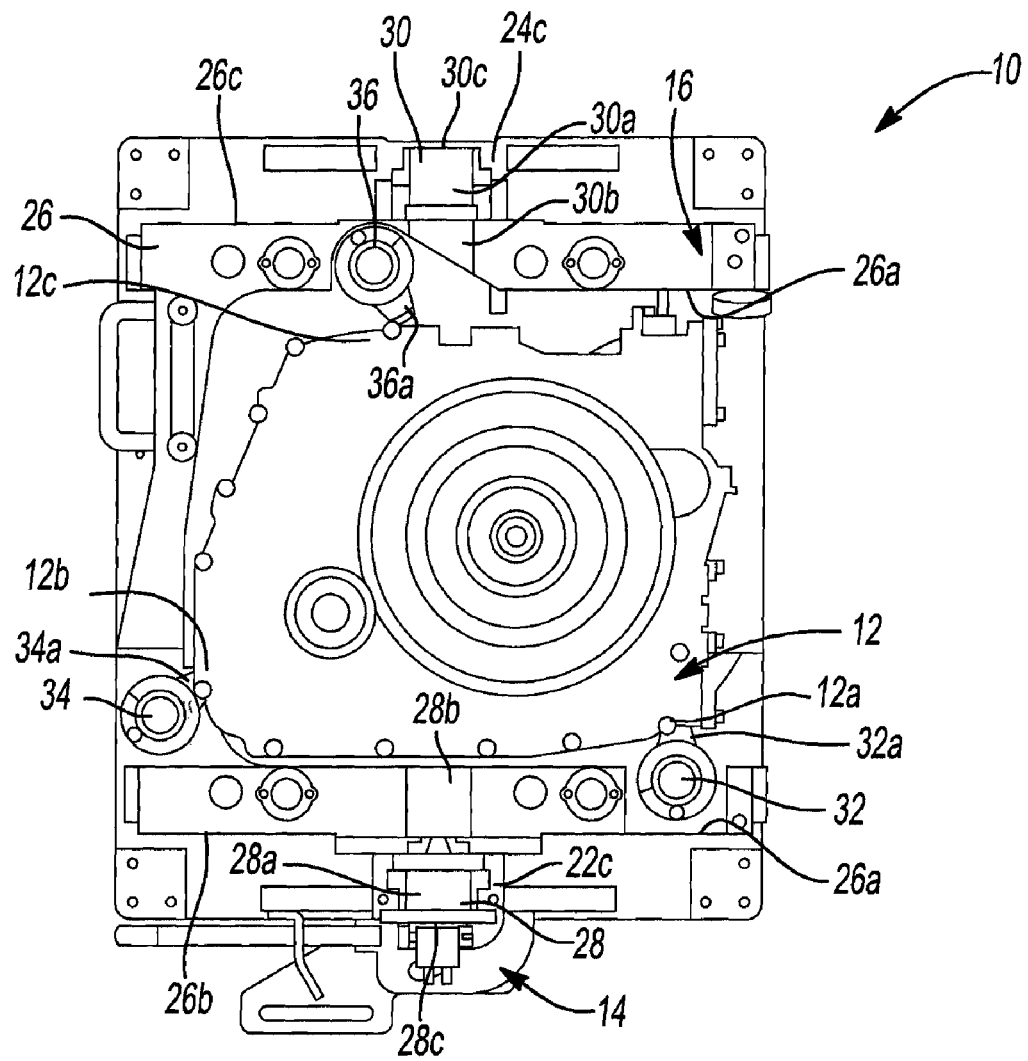
FIG. 3 is a plan view of the adaptable assembly fixture apparatus carrying a first transmission in accordance with an example of the present invention.

Referring now to FIGS. 2 and 3 with continuing reference to FIG. 1, a plan view of the universal fixture 16 is shown and will now be described. The universal fixture 16 includes a frame 26, a first and a second support arm 28, 30, and a first, a second and a third workpiece mount 32, 34, 36. The frame 26 surrounds the first workpiece 12 on at least three sides with a first, second and third members 37, 39, 41 fixedly connected to each other at predominately right angles at the ends 37A, 37B, 39A, 39B, 41A, 41B of each member 37, 39, 41.

Two of the members, for example, the first and second members 37, 39 are disposed opposite each other. An open side 26A of the universal fixture 16 permits ergonomic loading and unloading of the first workpiece 12. The first and second support arms 28, 30 have a cylindrical portion 28A, 30A with a first end 28B of the first support arm 28 fixed to the first member 37 of the universal fixture 16 and a first end 30B of the second support arm 30 fixed to the second member 39 of the universal fixture 16. The support arms 28, 30 extend outwardly from the frame 26. The first and second support arms 28, 30 are aligned coaxially along an axis i and are rotatably supported by the semicylindrical members 22C, 24C of the support members 22, 24 of the pallet 14. The first and second support arms 28, 30, and for that matter the universal fixture 16, can be rotated about the axis i. A locking mechanism 22D is disposed on at least one of the semicylindrical members 22C, 24C of the pallet 14 and the support arms 28, 30 of the universal fixture 16. The locking mechanism 22D is selectively activated for locking the universal fixture 16 in a plurality of rotated positions relative to the pallet 14 depending on the operation being performed on the first workpiece 12.

The workpiece mounts 32, 34, 36 are each disposed on the frame 26 corresponding to and aligning with three locator or mounting features 12A-C on the first workpiece 12 and shown in FIG. 3. It should be appreciated that the specific locations of the workpiece mounts 32, 34, 36 as well as the number of workpiece mounts may vary without departing from the scope of the present invention. At least one but usually all of the workpiece mounts 32, 34, 36 include clamp mechanisms 32A, 34A, 36A in order to retain the locator features 12A-C of the first workpiece 12. The clamping mechanisms 32A, 34A, 36A of the workpiece mounts 32, 34, 36 can be any one of a number of clamping methods including locking clamps or threaded fasteners. Additionally, the workpiece mounts 32, 34, 36 are also capable of locating and clamping the adaptable fixture 18 as described in more detail below.

Figure 4A:
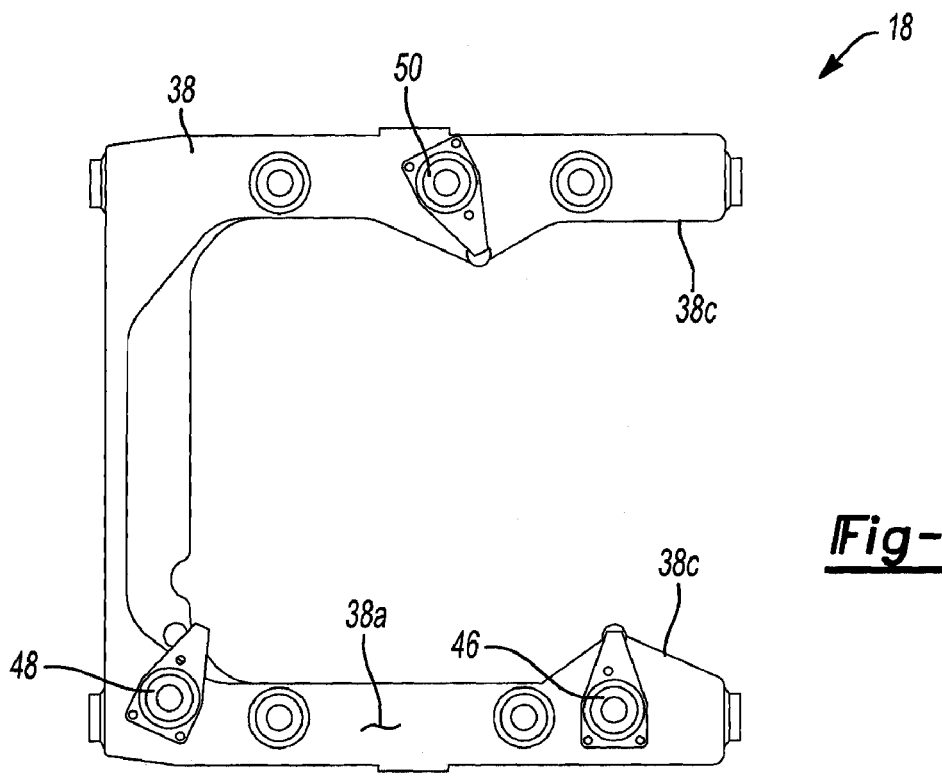
FIG. 4A is a top plan view of the adaptable fixture in accordance with an example of the present invention.
Figure 4B:
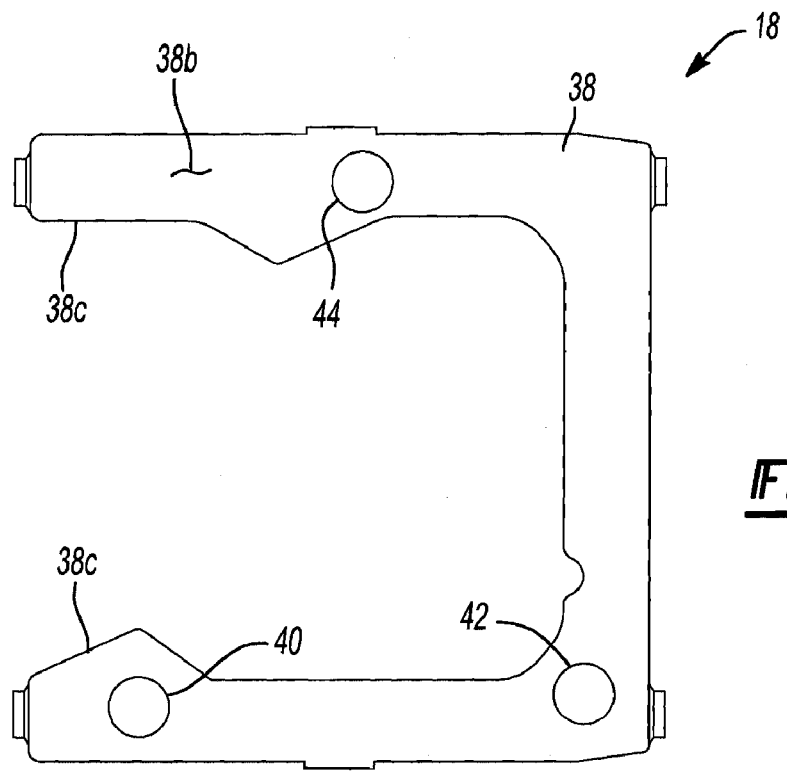
FIG. 4B is a bottom plan view of the adaptable fixture in accordance with an example of the present invention.
Figure 5:
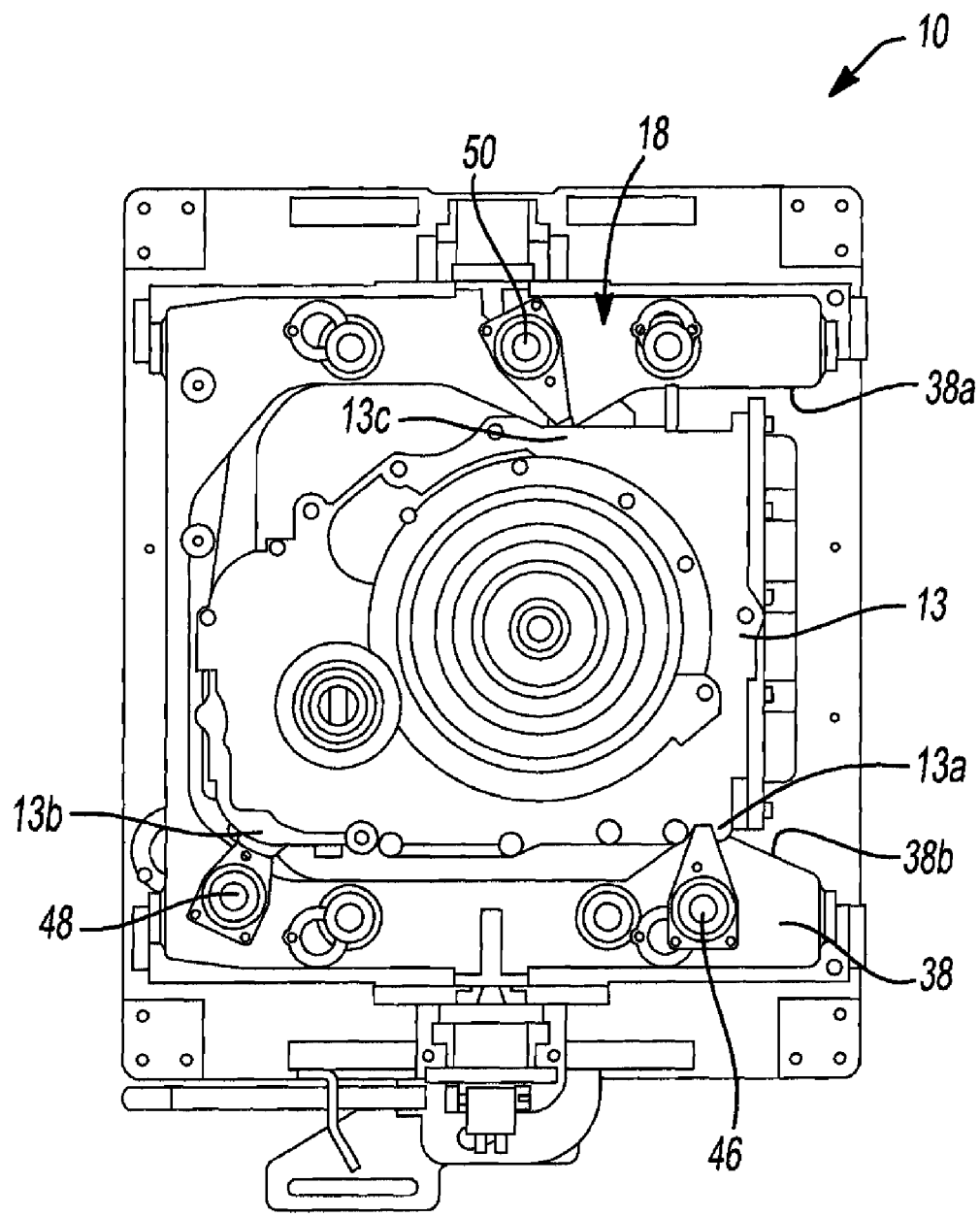
FIG. 5 is a plan view of the universal fixture in accordance with an example of the present invention.

Referring now to FIGS. 4A, 4B and 5 with continuing reference to FIG. 1, the adaptable fixture 18 is shown and will now be described. As shown in FIGS. 1 and 5, the adaptable fixture 18 is mounted to the universal fixture 16 to provide a support structure for a second workpiece 13 which may be a second transmission having external features different than the first workpiece 12. For example, the locating or mounting features of the second workpiece 13 may be located differently from those of the first workpiece 12 due to changes in the size and shape of the transmission. FIG. 4 shows the adaptable fixture 18 including a frame 38, a first, second and third fixture mounts 40, 42, 44 and a first, second and third workpiece mounts 46, 48, 50. The frame 38 follows the same basic shape as the frame 26 of the universal fixture 16. The frame 38 surrounds the outer perimeter of the workpiece and has a top and bottom surfaces 38A, 38B and an open side 38C that aligns with the open side 26A of the universal fixture 16 when mounted to the universal fixture 16, as shown in FIG. 5. The fixture mounts 40, 42, 44 are disposed on the bottom surface 38B of the frame 38 and in position to receive the workpiece mounts 32, 34, 36 of the universal fixture 16. As previously stated, the workpiece mounts 32, 34, 36 are capable of securing the first workpiece 12 to the universal fixture 16. However, the workpiece mounts 32, 34, 36 are also capable of clamping the fixture mounts 40, 42, 44 of the adaptable fixture 18. The workpiece mounts 46, 48, 50 of the adaptable fixture 18 are capable of locating and clamping the second workpiece 13 at three workpiece locator or machine lugs 13A-C in the same manner as the universal fixture 16 locates and clamps the locators 12A-C of the first workpiece 12.

The adaptable assembly fixture apparatus 10 is capable of being utilized in a number of ways. For example, the adapter system 10 can be designed such that the universal fixture 16 is capable of clamping to both a transmission and multiple adaptable fixtures 18 having the same fixture mounts 40, 42, 44. The universal fixture 16 may also be designed to receive different variations of the adaptable fixtures 18 so that each transmission is mounted to the universal fixture 16 using a dedicated adaptable fixture 18. In either example, a significant cost and space savings is realized by reducing the amount of the dedicated assembly pallet 14 that is required for each additional transmission.

The description of the invention is merely exemplary in nature and variations that do not depart from the gist of the invention are intended to be within the scope of the invention. Such variations are not to be regarded as a departure from the spirit and scope of the invention.

What is claimed is:

1. An apparatus for transporting a first workpiece assembly, the apparatus comprising:
a pallet having a rectangular base, a first support member and a second support member, the base having a first edge and a second edge opposite the first edge, the first support member having first end fixed to the first edge of the base and the second support member having a first end fixed to the second edge of the base;

a universal fixture having a frame, a first and a second support arms, and a first, a second and a third workpiece mounts, the frame having a first member and a second member opposite the first member, a first end of the first support arm fixed to the first member of the frame and a first end of the second support arm fixed to the second member of the frame, the first, second and third workpiece mounts fixed to at least the first and second members of the frame, the universal fixture rotatably supported by the first and second support members of the fixture pallet through the first and second support arms; and an adaptable fixture having a frame, a first, a second and a third fixture mounts and a first, a second and a third workpiece mounts, the frame having a top and a bottom surface, the fixture mounts disposed on the bottom surface of the frame and aligned with the workpiece mounts of the universal fixture, the first, second and third workpiece mounts of the adaptable fixture disposed on the top surface of the frame and aligned with a first, second and third locator of the workpiece assembly.

2. The apparatus of claim 1 wherein the support members of the pallet each include a second end having a semicylindrical member, the semicylindrical member of the first support member is axially aligned with the semicylindrical member of the second support member.

3. The apparatus of claim 2 wherein the first and the second support arm of the universal fixture each have a cylindrical portion, the cylindrical portion of the first support arm having an axis aligned with an axis of the cylindrical portion of the second support arm.

4. The apparatus of claim 3 wherein the cylindrical portion of the first support arm is rotatably supported by the semicylindrical member of the first support member of the fixture pallet and the cylindrical portion of the second support arm is rotatably supported by the semicylindrical member of the second support member.

5. The apparatus of claim 4 wherein the universal fixture has a 360° rotational range of motion relative to the pallet on the axis of the cylindrical portions of the support arms.

6. The apparatus of claim 5 wherein at least one of the semicylindrical members of the pallet and the cylindrical portions of the universal fixture includes a rotational locking mechanism.

7. The apparatus of claim 6 wherein the workpiece mounts of the universal fixture and the adaptable fixture include clamping mechanisms.

8. The apparatus of claim 1 wherein the pallet is fixed to an automatic guided vehicle.

9. The apparatus of claim 1 wherein the pallet is transported by a conveying system.

10. An apparatus for transporting a first workpiece assembly, the apparatus comprising:

a pallet having a rectangular base, a first support member and a second support member, the base having a first edge and a second edge opposite the first edge, the first support member having first end fixed to the first edge of the base and a second end having a semicylindrical member and the second support member having a first end fixed to the second edge of the base and a second end having a semicylindrical member;

a universal fixture having a frame, a first and a second support arms, and a first, a second and a third workpiece mounts, the frame having a first member and a second member opposite the first member, the first support arm having cylindrical portion and a first end fixed to the first member of the frame and the second support arm having a cylindrical portion and first end fixed to the second member of the frame, the first, second and third workpiece mounts fixed to at least the first and second members of the frame, the universal fixture rotatably supported by the first and second support members of the fixture pallet through the first and second support arms; and an adaptable fixture having a frame, a first, a second and a third fixture mounts and a first, a second and a third workpiece mounts, the frame having a top and a bottom surface, the fixture mounts disposed on the bottom surface of the frame and aligned with the workpiece mounts of the universal fixture, the first, second and third workpiece mounts of the adaptable fixture disposed on the top surface of the frame and aligned with a first, second and third locator of the workpiece assembly.

11. The apparatus of claim 10 wherein the cylindrical portion of the first support arm is rotatably supported by the semicylindrical member of the first support member of the fixture pallet and the cylindrical portion of the second support arm is rotatably supported by the semicylindrical member of the second support member.

12. The apparatus of claim 11 wherein the universal fixture has a 360° rotational range of motion relative to the pallet on the axis of the cylindrical portions of the support arms.

13. The apparatus of claim 12 wherein at least one of the semicylindrical members of the pallet and the cylindrical portions of the universal fixture includes a rotational locking mechanism.

14. The apparatus of claim 13 wherein the workpiece mounts of the universal fixture and the adaptable fixture include clamping mechanisms.

15. The apparatus of claim 10 wherein the pallet is fixed to an automatic guided vehicle.

16. The apparatus of claim 10 wherein the pallet is transported by a conveying system.

17. An apparatus for transporting a first workpiece assembly, the apparatus comprising:

a pallet having a rectangular base, a first support member and a second support member, the base having a first edge and a second edge opposite the first edge, the first support member having first end fixed to the first edge of the base and a second end having a semicylindrical member and the second support member having a first end fixed to the second edge of the base and a second end having a semicylindrical member;

a universal fixture having a frame, a first and a second support arms, and a first, a second and a third workpiece mounts, the frame having a first member and a second member opposite the first member, the first support arm having cylindrical portion and a first end fixed to the first member of the frame and the second support arm having a cylindrical portion and first end fixed to the second member of the frame, the first, second and third workpiece mounts fixed to at least the first and second members of the frame, the universal fixture rotatably supported by the first and second support members of the fixture pallet through the first and second support arms; and an adaptable fixture having a frame, a first, a second and a third fixture mounts and a first, a second and a third workpiece mounts, the frame having a top and a bottom surface, the fixture mounts disposed on the bottom surface of the frame and aligned with the workpiece mounts of the universal fixture, the first, second and third workpiece mounts of the adaptable fixture disposed on the top surface of the frame and aligned with a first, second and third locator of the workpiece assembly; and wherein at least one of the semicylindrical members of the pallet and the cylindrical portions of the universal fixture includes a rotational locking mechanism.

18. The apparatus of claim 17 wherein the cylindrical portion of the first support arm is rotatably supported by the semicylindrical member of the first support member of the fixture pallet and the cylindrical portion of the second support arm is rotatably supported by the semicylindrical member of the second support member.

19. The apparatus of claim 18 wherein the universal fixture has a 360° rotational range of motion relative to the pallet on the axis of the cylindrical portions of the support arms.

20. The apparatus of claim 19 wherein the workpiece mounts of the universal fixture and the adaptable fixture include clamping mechanisms.

* * * * *